Oct. 14, 1958     W. C. SAEMAN     2,856,270
CRYSTALLIZER
Filed Nov. 9, 1955
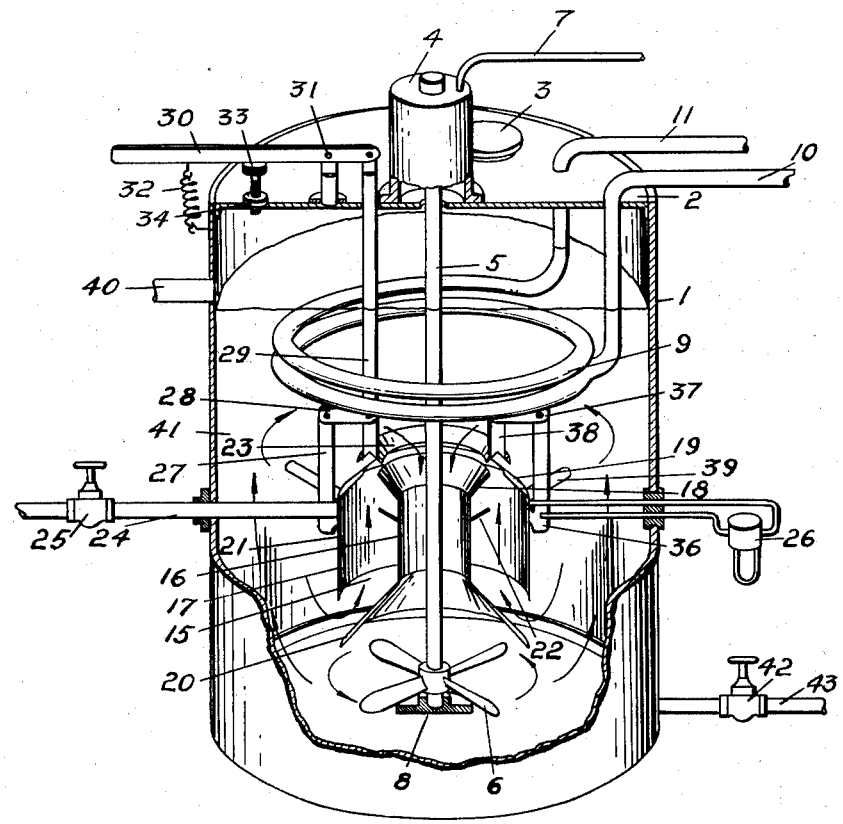
INVENTOR.
WALTER C. SAEMAN
BY
ATTORNEY

United States Patent Office 2,856,270
Patented Oct. 14, 1958

2,856,270

CRYSTALLIZER

Walter C. Saeman, Orange, Conn., assignor to Olin Mathieson Chemical Corporation, New Haven, Conn., a corporation of Virginia Application November 9, 1955, Serial No. 545,811

5 Claims. (Cl. 23—273)

This invention relates to a crystallizer and more particularly to a crystallizer for producing large crystalline material from turbulent suspensions.

In the past, commercial crystallizers of the turbulent suspension type were used for precipitating crystalline materials from solutions without positive means for controlling or regulating the size and shape of crystals produced. Where large crystals were desired, these were selectively removed from the suspension of mixed crystals while the remaining smaller crystals were either redissolved or disposed of by other means.

The apparatus disclosed in U. S. 1,845,742 was the first crystallizer which exerted a control over another factor important in producing large crystalline particles in mixed suspensions, namely, the number of seed crystals permitted to exist in the suspension upon which growth could occur. Obviously, if only a limited number of seeds are permitted to exist, deposition of material upon these only will occur and produce larger crystals than those produced if the same amount of material were deposited on a larger number of seed crystals. The crystallizer of U. S. 1,845,742 used a screen to separate the fines from the main suspension. These undesired fines were redissolved and the mother liquor returned to the main suspension so that economical use of all material could be made. The return stream was used to separate the coarse end crystals from the smaller crystals taken off from the main suspension as the product stream. But as discussed in a copending patent application entitled "Crystallization" Serial Number 414,192, filing date March 4, 1954, now Patent No. 2,827,366, the apparatus disclosed in U. S. 1,845,742 was not completely satisfactory for commercial use. Its screen frequently clogged. Its combined fines takeoff, fines redissolving and product crystal separation streams were not economical and furthermore upset the optimum crystallization conditions desired in the main suspension. The copending patent application describes another apparatus which overcomes these deficiencies in U. S. 1,845,742. The apparatus uses a novel arrangement of baffles for continuously elutriating the undesired fines from the turbulent suspension. The elutriation stream rate is controlled by the circulation rate of the suspension. After the fines are elutriated, they are settled as in U. S. 1,845,742, in a redissolving tank, redissolved and the resultant liquor returned to the suspension.

An object of this invention is to provide a crystallizer in which coarse crystalline material can be preferentially produced by an economical technique. A further object of this invention is to provide a crystallizer in which coarse crystalline material is preferentially produced by exerting a control over the number of fine crystals existing in the main crystallizing body in order to concentrate deposition upon desired seed crystals. A further object of this invention is to provide a crystallizer which removes undesired fine crystals in highly concentrated form from the main crystallizing body with a stream of relatively low flow rate so that these fine crystals may be most economically redissolved in a settling zone. Other objects will become apparent to those skilled in the art upon reading the following detailed disclosure and drawing in which a broken perspective view of a preferred embodiment of a crystallizer meeting the above objects is shown.

Broadly, the crystallizer which accomplishes the objects enumerated above consists of a tank with circulating and temperature control means for producing optimum crystallizing conditions by evaporation or cooling of the solvent, an agitator for circulation and a trap for collecting, concentrating and removing undesired fines from the suspension. More particularly speaking, the crystallizer of this invention consists of a tank with circulating and temperature control means for producing optimum crystallizing conditions, a downward opening enclosure with a throttled opening at its upper end and an intermediate outlet for removing a dense suspension of undesired fines at a controlled rate, the removal stream communicating with a crystal settling and redissolving zone which in turn communicate with the main suspension body.

Referring particularly to the drawing, the crystallizer consists of a tank 1, fitted with a cover 2 in which is a manhole 3. Upon the cover rests an electrical motor 4 which drives an agitator shaft 5 and an agitator blade 6. An electrical conduit 7 supplies current to the motor 4. The shaft 5 is supported at its lower end by a bearing 8. Disposed within the tank are coils 9 for either heating or cooling the crystalline suspension. The coils have an inlet 10 and an outlet 11.

Surrounding the agitator shaft 5 at a point substantially midway the top and bottom of tank 1 is a cylindrical hooded enclosure 15 bounded by two concentric cylinders 16 and 17 each having an upper end 18 and 19 respectively which flares towards the other. The inner cylinder 16 has a lower outward flaring end 20 which acts as a draft tube over the agitator blade 6. The two concentric cylinders enclose a volume 21 having the shape of a ring. The cylinders 16 and 17 are joined to each other by supports 22 stretching across the volume they enclose. An inverted cross sectional V-shaped throttling ring 23 is situated opposite the upward facing opening of the enclosure. The entire hooded structure resembles a ring shaped enclosure open at the bottom. An outlet 24 having valve 25 leads from volume 21 of the ring shaped enclosure. A manometric differential pressure gauge 26 communicating with volume 21 indicates the pressure therein with respect to the surrounding suspension. The throttling ring 23 is supported by outer cylinder braces 27, cross bar 28 and operating rod 29. A pivoted lever 30 operates the operating rod. The lever is pivoted at pivot 31 and is spring biased downwardly by spring 32. Stop screw 33 having lock nut 34 acts to control the position of the lever 30. Additional supports for the throttling ring 23 are located at a distance from brace 27 around the periphery of the outer cylinder 17. The one additional support shown is similar to the first support, consisting of an outer cylinder brace 36, cross bar 37 and hanger 38. Radial extending brackets 39 support the hood structure 15 to the inner walls of tank 1.

The tank is supplied with saturated solution through inlet 40. A main suspension 41 consisting of crystals held in suspension by agitation continuously circulates within the tank. Intermittent discharge of the suspension when coarse crystals are present therein is effected by opening valve 42 of outlet 43.

In operation, saturated solution in which the material to be crystallized is dissolved, is supplied to tank 1 through inlet 40. The solution after entering the tank is circulated by agitator 6 under optimum crystallizing conditions until crystal nuclei begin to deposit out of solution. It is generally found that these crystal nuclei far exceed the number needed as seeds for growing large crystals. The undesired nuclei or fine crystals (nuclei after some growth thereon) are continuously removed by the use of the ring-shaped enclosure which acts as an elutriator. The volume 21 enclosed by the enclosure is a quiescent zone within the circulating suspension. Since it is a quiescent zone, solution near the bottom opening of the enclosure will tend to flow upward more readily through the quiescent volume within the trap rather than the heavier suspension of crystals on the outside. This flow of solution is, however, restrained by the throttling ring 23 at the top. Small crystals will enter the trap through the bottom with the solution and will subside to a definite layer within the trap. The position of the subsided layer is dependent on the rate of flow of solution. The upper layer of subsided fines may, therefore, be brought into coincidence with the fines withdrawal tube 24 for removal to the dissolving tank. The withdrawal tube or fine crystal outlet communicates with a dissolving tank where the undesired fines are redissolved in the mother liquor. The resulting solution may then be fed to the feed stream of the crystallizer.

As the level of subsided fines within the trap rises and falls, the differential pressure between the inside and outside of the trap also varies. This differential pressure may be registered on manometer 26 and used as a means for regulating the level of subsided fines within the trap.

After crystals of sufficient size have been grown, valve 42 of outlet 43 is opened. Suspension containing the crystals may then be withdrawn. In theory, as discussed in the copending patent application referred to above, the cumulative weight of crystals in a suspension is directly proportional to the seed rate and the fourth power of the linear size of the crystals according to the following equation:

$$W = anL^4$$

where
$W$ = cumulative weight
$a$ = constant
$n$ = seed rate
$L$ = linear size of a crystal The proportion of seed crystals in suspension under normal conditions may, therefore, be shown to be so small as to be negligible. Thus, the weight friction of ¼ and ½ size crystals in the product is only 1/256 and 1/16, respectively. Furthermore, it is evident that for a given weight of suspension, W, the size L will be large if the seed rate n is kept small.

In order to keep this seed rate low, a control over the number of seed crystals allowed to remain in the crystallizing body must be exerted; i. e., controlled so that only a few seed crystals remain. This in a way is the basis of operation of the crystallizer of this invention. The copending patent application referred to above uses a similar basis of operation but elutriates the undesired fines by an externally induced flow of liquid. The apparatus of this invention differs in this respect in that the flow for elutriation is induced by natural convection through its submerged fines trap 15. The natural convection results from the fact that solution at the bottom opening of the trap tends to flow more readily through the light classified suspension of fine crystals inside the trap than through the relatively dense turbulent suspension on the outside. This difference in density is due to the difference in the size and number of crystals in the quiescent zone within the trap as compared to the turbulent suspension outside the trap. A hydraulic gradient between the outside and the inside therefore exists and this induces an upward flow of suspension within the trap. The manometric pressure guage 26 measures this gradient.

The throttled opening at the top of the trap controls the upward flow. And this upward flow acts to support crystals within the trap. As the flow rate is increased, but never above the natural convection flow rate, crystals entering into the trap subside in definite layers. Due to different settling rates of each different size crystals, a layer of the smallest crystals forms at the top of the trap with increasing size crystals in lower layers. Crystals of such size that they cannot be supported by the flow leave the trap or else never enter the trap. Fines outlet 24 at the top of the trap withdraws these fines in layers as the layer reaches the level of the outlet. By proper adjustment of the throttling ring 23, the solution flow through the trap is adjusted to take off fines of a certain size. As should be evident by the discussion above, the trap, in effect, is a condensing apparatus, which permits the taking off of dense suspensions of fines. The previous crystallizer of the copending application has no such condensing feature in its fines trap.

In operation, it is found that the settling rate of the crystals to be produced has an effect upon the size of the trap to be used. The fines trap is preferably of such size that all the solution in the crystallizer can be flowed through the trap without carry over of fines, about twenty to fifty times during the average retention time of crystals in the crystallizer (the recycle rate). This can be calculated by determining the amount of material, the length of time circulated and using these to calculate the flow rate needed through the trap to get a 20–50 fold recycle rate. Then by noting the allowable maximum flow velocity which is determined by the settling rate of the crystal, the cross sectional area of the trap can be determined.

As an example, in crystallizing ammonium sulfate, it is determined that its fine crystals settle at a rate of 5 feet/minute. This is therefore the limiting velocity which may be used in the trap. If the crystals are held 200 minutes in a suspension of 2000 cubic feet, the trap circulation must be 200 cubic feet/minute for a 20 fold recycle rate. For the limiting 5 feet/minute flow velocity to prevent carry over, the cross sectional area of the trap must be 40 square feet. This amounts to about 20% of the cross sectional area of a 2000 cu. ft. circular tank crystallizer.

The optimum position of the fines level with respect to the fines outlet is determined by sampling the fines withdrawn by the outlet. At low flows through the trap only clear saturated solution is withdrawn. As the flow is increased by progressively raising throttling ring 23, a point is reached where fines suddenly appear in the stream. The trap flow control is then held in this position.

In practice it is found that the density of the fines withdrawn by the fines outlet requires withdrawal of only about 1/10 to 1/100 of that required to be withdrawn by the crystallizer of the cited copending patent application. This unexpected advantage of being able to remove undesired fines in dense suspension has resulted in economies in the redissolving and returning of the resultant liquor to the main suspension. A smaller settling tank, less energy for redissolving and lesser upsetting of the optimum conditions in the main suspension results from this new manner of elutriation.

As should be obvious, the crystallizer is adaptable for both batch and continuous operation. It is useful for crystallizing all crystallizable material such as ammonium nitrate, ammonium sulfate, sodium sulfate, sodium chloride, potassium sulfate and the like. Where evaporation or cooling is required the crystallizer can be adapted for such operation. Although a concentric, symmetrical trap was described above other cross-sectional shapes such as cylinders, rectangular shapes positioned symmetrically or assymetrically within the suspension are equally suitable. The parts shown are also obviously subject to modification and substitution. These should be considered a part of the invention.

The invention having thus been described what is desired to be secured by Letters Patent is as follows:

1. A crystallizer of the turbulent suspension type comprising a crystallizer tank with a feed inlet, a product outlet, means for maintaining a turbulent suspension in the main body of the tank, and heat exchange means for effecting optimum crystallizing conditions therein, a downward facing open-ended, annular, enclosure within said tank for trapping fines in a relatively quiet zone, said enclosure having adjustable throttling means in its upper section controlling an opening to the main suspension and a fines outlet leading to a fines redissolving and tank return means.

2. A crystallizer of the turbulent suspension type comprising a crystallizer tank with a feed inlet and a product outlet communicating with the main body of the suspension, heat exchange coils for effecting optimum crystallizing conditions in said tank, an agitator blade within said tank, driving means for said blade, a first downward facing open-ended, cylindrical element encircling the shaft of said agitator blade, a second cylindrical element concentric with the shaft and radially spaced from the first element to form an annular trap and adjustable throttling means adapted to control the opening at one end of said annular trap and effective to regulate the turbulence in the trap.

3. A crystallizer having a trap for segregating fines in high concentrations comprising a tank having suitable inlet and outlet openings, a pair of radially spaced, concentric, cylindrical elements disposed within the tank, a corresponding end of each said element having marginal portions thereof flared towards one another so as to partially enclose the annular space between said elements, a throttling means movably mounted above said flared ends and adapted to move to and fro with respect to said elements whereby one end of said annular space may be substantially closed, and pump means effective to induce fluid flow in a first predetermined path including the center of the inner cylindrical element and along a second predetermined path including the annular space between said cylindrical elements, said throttling ring being movable to vary the rate of flow in the first path relative to the second.

4. A crystallizer having a trap for segregating fines in high concentrations comprising a tank having suitable inlet and outlet openings, a pair of radially spaced, concentric, cylindrical elements disposed within the tank to define an annular trap, corresponding ends of each said element having marginal portions thereof flared towards one another so as to partially enclose the annular space between said elements, a throttling ring movably mounted above said flared ends and adapted to move to and fro with respect to said flared ends whereby said trap is substantially closed, and pump means effective to induce fluid flow in a first predetermined path including the center of the inner cylindrical element and along a second predetermined path including the annular space between said cylindrical elements, said throttling ring being movable to vary the rate of flow in the first path relative to the second.

5. A crystallizer adapted to segregate fine crystals in high concentrations to facilitate removal of the fines from a main turbulent suspension comprising a main tank having inlet and discharge openings communicating therewith, pump means for circulating the main suspension, a trap centrally disposed within the tank, said trap being formed by a pair of spaced cylindrical baffles each terminating in opposed, flared, marginal portions coooperating to define an annular orifice, valve means cooperating with said flared portions and movable relative thereto for regulating fluid flow through said orifice and effective to encourage a portion of the main suspension supporting fines to circulate through the orifice whereby the fines are accumulated in the trap.

References Cited in the file of this patent

UNITED STATES PATENTS

| | | |
|---|---|---|
| 863,279 | Horton et al. | Aug. 13, 1907 |
| 1,478,337 | Isaachsen | Dec. 18, 1923 |
| 1,890,206 | Andrews | Dec. 6, 1932 |
| 2,078,627 | Block et al. | Apr. 27, 1937 |
| 2,232,115 | Koppers | Feb. 18, 1941 |
| 2,409,790 | Otto | Oct. 22, 1946 |